(12) United States Patent
Sokolov et al.

(10) Patent No.: US 10,706,167 B1
(45) Date of Patent: Jul. 7, 2020

(54) SYSTEMS AND METHODS FOR ENFORCING PRIVACY IN CLOUD SECURITY

(71) Applicant: Symantec Corporation, Mountain View, CA (US)

(72) Inventors: Ilya Sokolov, Boston, MA (US); Lei Gu, Bedford, MA (US); Jason Holler, Reston, VA (US); Tim van der Horst, Springville, UT (US)

(73) Assignee: NortonLifeLock Inc., Tempe, AZ (US)

( * ) Notice: Subject to any disclaimer, the term of this patent is extended or adjusted under 35 U.S.C. 154(b) by 107 days.

(21) Appl. No.: 15/646,522

(22) Filed: Jul. 11, 2017

(51) Int. Cl.
| | |
|---|---|
| *G06F 21/56* | (2013.01) |
| *G06F 21/60* | (2013.01) |
| *G06F 21/62* | (2013.01) |
| *H04L 29/06* | (2006.01) |
| *G06F 11/14* | (2006.01) |
| *G06F 21/78* | (2013.01) |

(52) U.S. Cl.
CPC ...... *G06F 21/6218* (2013.01); *G06F 11/1458* (2013.01); *G06F 21/602* (2013.01); *G06F 21/78* (2013.01); *H04L 63/0428* (2013.01); *G06F 2221/2107* (2013.01)

(58) Field of Classification Search
CPC ........... G06F 21/60; G06F 21/56; H04L 63/04
See application file for complete search history.

(56) References Cited

U.S. PATENT DOCUMENTS

| | | | | |
|---|---|---|---|---|
| 8,806,625 | B1 * | 8/2014 | Berger | H04L 9/3236 711/118 |
| 2015/0172304 | A1 * | 6/2015 | Kleczynski | H04L 63/1416 726/23 |
| 2017/0177608 | A1 * | 6/2017 | Cismas | G06F 16/176 |
| 2018/0032446 | A1 * | 2/2018 | Amarendran | G06F 21/6218 |

OTHER PUBLICATIONS

Harrison et al.; Nearly 1 Million New Malware Threats Released Every Day; Apr. 14, 2015; http://money.cnn.com/2015/04/14/technology/security/cyber-attack-hacks-security/, as accessed May 22, 2017; CNN.

* cited by examiner

*Primary Examiner* — Izunna Okeke
(74) *Attorney, Agent, or Firm* — FisherBroyles LLP

(57) ABSTRACT

A computer-implemented method for enforcing privacy in cloud security may include (i) identifying, by a computing device, a set of files in a backup process for a cloud service, (ii) determining, by the computing device, that at least one file in the set of files is a private file, (iii) modifying, by the computing device encrypting the private file, the set of files in the backup process, (iv) completing the backup process for the cloud service with the modified set of files, and (v) enforcing a security policy of the cloud service based on a scan of file hashes. Various other methods, systems, and computer-readable media are also disclosed.

18 Claims, 7 Drawing Sheets

SYSTEMS AND METHODS FOR ENFORCING PRIVACY IN CLOUD SECURITY

BACKGROUND

Security software is often used to protect computers from malicious software, or malware. Malware detection is typically performed on individual client devices, with security software scanning files on a single device to provide protection for that device. However, in some cases, users may choose to not deploy security software, or there may be settings on a device that prevent certain functions of the security software. For example, a client device that belongs to a corporation may have strict controls to prevent the scanning of file contents, which security software may need to access to detect malware. In other cases, security software may not be installed on the device or the installed software may lack some capabilities. Therefore, client devices may not always be protected.

Some solutions attempt to detect or prevent malware in the cloud to bypass issues with security software on client devices. For example, an email service may scan emails in the cloud to detect whether any emails contain malware. Most cloud-based security solutions may require files to be unencrypted in order to scan them for malware. However, users may be concerned about privacy for certain files that contain personal or intellectual information, and cloud-based security solutions may not be able to guarantee the privacy of such files. Thus, cloud-based security needs to handle these privacy issues when providing malware detection for clients. The instant disclosure, therefore, identifies and addresses a need for improved systems and methods for enforcing privacy in cloud security.

SUMMARY

As will be described in greater detail below, the instant disclosure describes various systems and methods for enforcing privacy in cloud security. In one example, a computer-implemented method for enforcing privacy in cloud security may include (i) identifying, by a computing device, a set of files in a backup process for a cloud service, (ii) determining, by the computing device, that at least one file in the set of files is a private file, (iii) modifying, by the computing device encrypting the private file, the set of files in the backup process, (iv) completing the backup process for the cloud service with the modified set of files, and (v) enforcing a security policy of the cloud service based on a scan of file hashes.

In one embodiment, determining that the file is a private file may include using a file classifier to classify the content of the file. In this embodiment, using the file classifier to classify the content of the file may include determining that the file contains personally identifiable information and/or determining that the file contains intellectual information. Additionally or alternatively, determining that the file is a private file may include identifying a private origin of the file. In this embodiment, the private origin of the file may include a personal device and/or a private file share system. In another embodiment, determining that the file is a private file may also include determining that a list of known private files of the cloud service includes the file, receiving confirmation that the file is private from a user of the computing device, and/or improving the file classifier based on the received confirmation.

In some examples, modifying the set of files further may include encrypting metadata for the private file.

In some embodiments, the scan of file hashes may include a scan of hashes of public files in the set of files by the cloud service, a scan of hashes of public files on the computing device by the cloud service, a comparison of scanned file hashes with a file reputation database by the cloud service, a detection of malware, by the cloud service, in the scanned file hashes, and/or an identification of a file containing the malware. In these embodiments, enforcing the security policy of the cloud service may include alerting a user of the computing device about the file containing the malware, alerting a security program of the computing device about the file containing the malware, proposing a security solution to mitigate the malware, executing the security solution to mitigate the malware, and/or sending telemetry information about the malware to a central security system for analysis.

In some examples, the computer-implemented method may further include identifying a safe version of the file containing the malware.

In one embodiment, a system for implementing the above-described method may include (i) an identification module, stored in memory, that identifies, by a computing device, a set of files in a backup process for a cloud service, (ii) a determination module, stored in memory, that determines, by the computing device, that at least one file in the set of files is a private file, (iii) a modification module, stored in memory, that modifies, by the computing device encrypting the private file, the set of files in the backup process, (iv) a completion module, stored in memory, that completes the backup process for the cloud service with the modified set of files, and (v) an enforcement module, stored in memory, that enforces a security policy of the cloud service based on a scan of file hashes. In addition, the system may include at least one processor that executes the identification module, the determination module, the modification module, the completion module, and the enforcement module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, by the computing device, a set of files in a backup process for a cloud service, (ii) determine, by the computing device, that at least one file in the set of files is a private file, (iii) modify, by the computing device encrypting the private file, the set of files in the backup process, (iv) complete the backup process for the cloud service with the modified set of files, and (v) enforce a security policy of the cloud service based on a scan of file hashes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
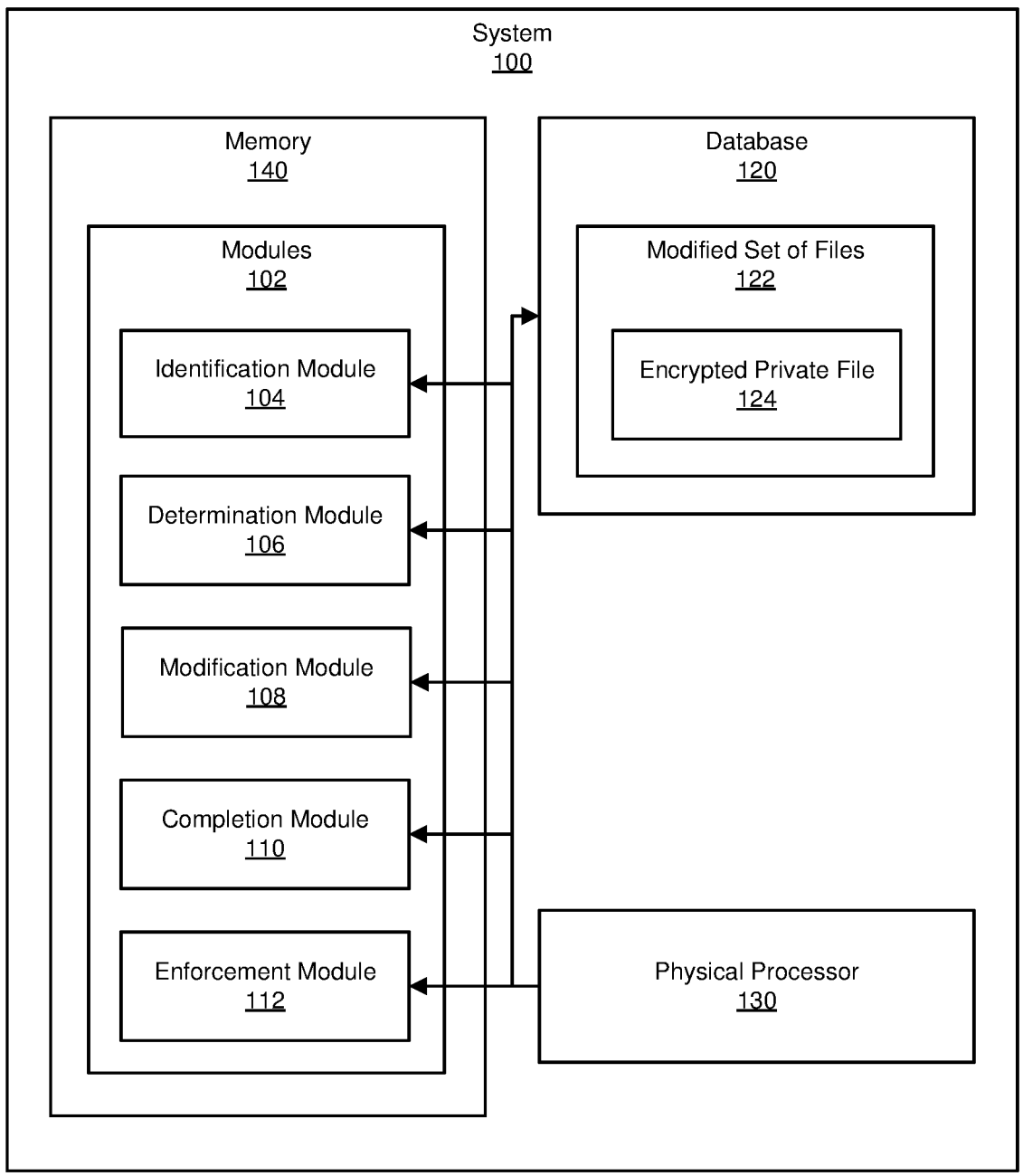
FIG. 1 is a block diagram of an example system for enforcing privacy in cloud security.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing privacy in cloud security. As will be explained in greater detail below, by detecting and encrypting private files on a client device prior to sending files to a cloud service, the systems and methods described herein may protect the privacy of users while also providing security benefits. For example, by classifying files into private and public files, the disclosed systems and methods may encrypt only files and the metadata of files known to contain private data. The systems and methods described herein may then allow public files and metadata such as file hashes to be scanned by cloud security. Furthermore, by detecting potential malware through the cloud service, the disclosed systems and methods may ensure protection of client devices, whether or not client devices have security software.

In addition, the systems and methods described herein may improve the functioning of a computing device by enforcing security policies associated with potential detection of malware by the cloud service. These systems and methods may also improve the fields of cloud security and/or file backup by identifying and mitigating backup files that may contain malware. Thus, the disclosed systems and methods may provide security functions for client devices without compromising user privacy.

Figure 2:
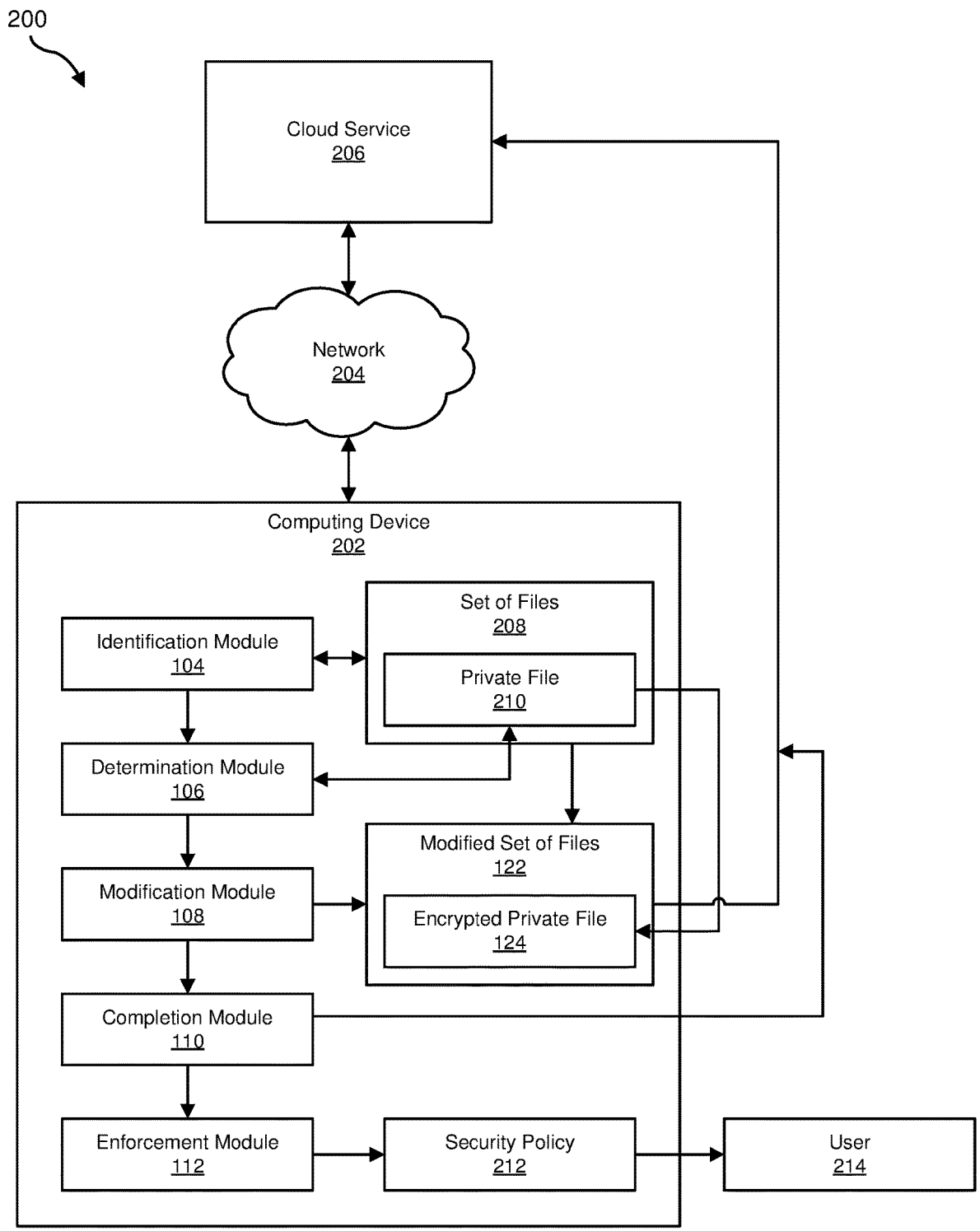
FIG. 2 is a block diagram of an additional example system for enforcing privacy in cloud security.

The following will provide, with reference to FIGS. 1 and 2, detailed descriptions of example systems for enforcing privacy in cloud security. Detailed descriptions of corresponding computer-implemented methods will also be provided in connection with FIG. 3. In addition, detailed descriptions of an example classification of example public and private files will be provided in connection with FIG. 4. Furthermore, detailed descriptions of an example cloud security detection of example malware will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of example system 100 for enforcing privacy in cloud security. As used herein, the terms "cloud" and "cloud service" generally refer to computing resources or environments that provide customized on-demand services via a network, such as the Internet. The term "cloud security," as used herein, generally refers to security solutions provided for a cloud environment or cloud-based service.

As illustrated in FIG. 1, example system 100 may include one or more modules 102 for performing one or more tasks. For example, and as will be explained in greater detail below, modules 102 may include an identification module 104 that identifies, by a computing device, a set of files in a backup process for a cloud service. The term "backup process," as used herein, generally refers to a computing process of copying and/or retaining data so that data may be recovered from potential loss.

Modules 102 may additionally include a determination module 106 that determines, by the computing device, that at least one file in the set of files is a private file. Modules 102 may also include a modification module 108 that modifies, by encrypting the private file, the set of files in the backup process. Modules 102 may further include a completion module 110 that completes the backup process for the cloud service with the modified set of files. In addition, modules 102 may include an enforcement module 112 that enforces a security policy of the cloud service based on a scan of file hashes. The term "file hash," as used herein, generally refers to metadata for a file that is created by converting digital data about the file into a fixed value. Notably, the process of hashing may be used to authenticate digital data and/or check the integrity of data against known values. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or a device running cloud service 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing privacy in cloud security. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a modified set of files 122, which may include an encrypted private file 124. Database 120 may represent portions of a single database or computing device or a plurality of databases or computing devices. For example, database 120 may represent a portion of computing device 202 and/or cloud service 206 in FIG. 2. Alternatively, database 120 in FIG. 1 may represent one or more physically separate devices capable of being accessed by a computing device, such as computing device 202 and/or a device running cloud service 206 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a cloud service 206 via a network 204. In one example, all or a portion of the functionality of modules 102 may be performed by computing device 202, cloud service 206, and/or any other suitable computing system. Similarly, parts of cloud service 206 and computing device 202 may be merged into a single machine or computing system such that the functionality of each of modules 102 is provided within a single device.

As will be described in greater detail below, one or more of modules 102 from FIG. 1 may, when executed by at least one processor of computing device 202 and/or cloud service 206, enable computing device 202 and/or cloud service 206 to provide privacy for secure file backup. For example, and as will be described in greater detail below, identification module 104 may identify a set of files 208 in a backup process for cloud service 206. Determination module 106 may determine that at least one file in set of files 208 is a private file, such as a private file 210. Modification module 108 may modify, by encrypting private file 210, set of files 208 in the backup process into modified set of files 122. Completion module 110 may complete the backup process for cloud service 206 with modified set of files 122. Enforcement module 112 may enforce a security policy 212 of cloud service 206 based on a scan of file hashes.

In the example of FIG. 2, and as will be explained in greater detail below, computing device 202 may first identify set of files 208 containing a multitude of files to be backed up to cloud service 206. Computing device 202 may then determine private file 210 in set of files 208 is private. Next computing device 202 may encrypt private file 210 as encrypted private file 124 and modify set of files 208 by replacing private file 210 with encrypted private file 124. Computing device 202 may also complete the backup process by sending modified set of files 122 to cloud service 206 via network 204. Finally, computing device 202 may enforce security policy 212, after a scan of file hashes of modified set of files 122 by cloud service 206, by alerting a user 214 about detected malware.

Computing device 202 generally represents any type or form of computing device capable of reading computer-executable instructions. For example, computing device 202 may represent an endpoint device running client-side backup software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Cloud service 206 generally represents any type or form of computing system that is capable of storing and/or scanning data. For example, cloud service 206 may represent a database server that stores files and runs security software. Additional examples of cloud service 206 include, without limitation, Software as a Service (SaaS), Platform as a Service (PaaS), Infrastructure as a Service (IaaS), digital media streaming, file hosting services, electronic commerce services, servers configured to run certain software applications and/or provide various security, storage and/or database services, variations or combinations of one or more of the same, and/or any other suitable cloud-based service.

Network 204 generally represents any medium or architecture capable of facilitating communication or data transfer. In one example, network 204 may facilitate communication between computing device 202 and cloud service 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
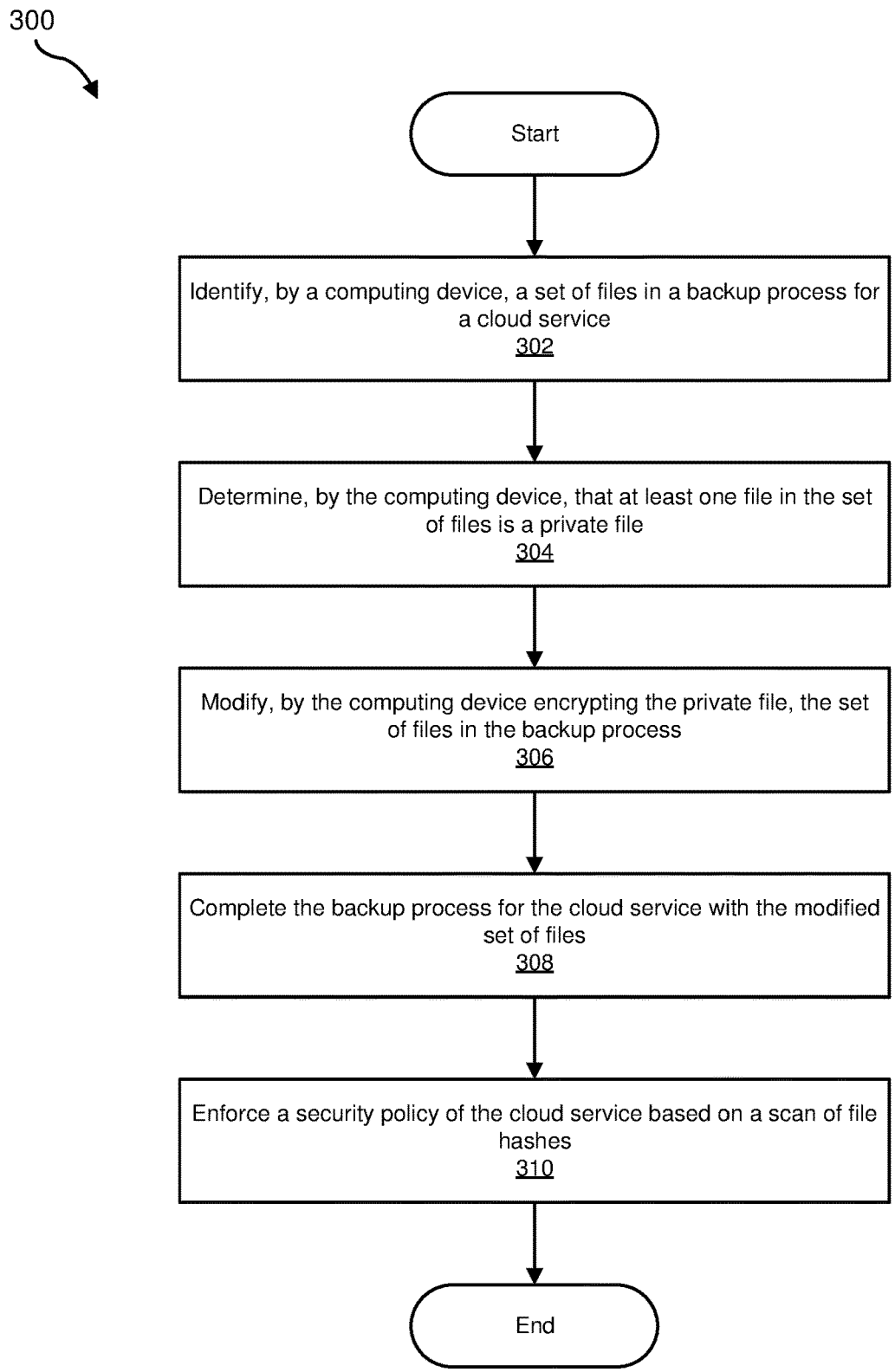
FIG. 3 is a flow diagram of an example method for enforcing privacy in cloud security.

FIG. 3 is a flow diagram of an example computer-implemented method 300 for enforcing privacy in cloud security. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify, by a computing device, a set of files in a backup process for a cloud service. For example, identification module 104 may, as part of computing device 202 in FIG. 2, identify set of files 208 in a backup process for cloud service 206.

Identification module 104 may identify set of files 208 in a variety of ways. In one example, identification module 104 may monitor a network connection to detect access to cloud service 206 and identify set of files 208 in an attempt to back up set of files 208. In some examples, computing device 202 may periodically back up files to cloud service 206 based on a predetermined schedule. Additionally or alternatively, user 214 may initiate the backup process for set of files 208. Identification module 104 may then identify set of files 208 selected for file backup.

Returning to FIG. 3, at step 304, one or more of the systems described herein may determine, by the computing device, that at least one file in the set of files is a private file. For example, determination module 106 may, as part of computing device 202 in FIG. 2, determine that private file 210 in set of files 208 is private.

Determination module 106 may determine that private file 210 is private in a variety of ways. In some embodiments, determination module 106 may determine that private file 210 is private by using a file classifier to classify the content of private file 210. The term "classifier," as used herein, generally refers to a mathematical function or algorithm that may utilize patterns in data to categorize observations. In these embodiments, the file classifier may distinguish between public and private files using various file attributes. For example, using the file classifier to classify the content of private file 210 may include determining that private file 210 contains personally identifiable information and/or determining that private file 210 contains intellectual information. The term "personally identifiable information," as used herein, generally refers to data that may be used to identify and/or locate a specific individual. The term "intellectual information," as used herein, generally refers to proprietary data or unique information that may be legally protected.

In other embodiments, determination module 106 may also determine that private file 210 is private by identifying a private origin of private file 210. In these embodiments, the private origin of private file 210 may include a personal device, such as computing device 202, and/or a private file share system. The term "file share," as used herein, generally refers to a process or service that facilitates sharing or transferring of data. For example, determination module 106 may determine, based on file attributes and/or metadata, that private file 210 originated from a client device and was shared by another user with user 214 via a file hosting website. Determination module 106 may then classify private file 210 as private.

Additionally or alternatively, determination module 106 may determine that a list of known private files of cloud service 206 includes private file 210. In these embodiments, cloud service 206 and/or computing device 202 may maintain the list of known private files, which may include information about individual files and/or file attributes. For example, the list of known private files may include a file type or file extension for which all files may be classified as private. As another example, the list may be managed by cloud service 206 and include files from multiple client devices including computing device 202. In alternate embodiments, determination module 106 may also receive confirmation that private file 210 is private from user 214 of computing device 202 and/or improve the file classifier based on the received confirmation. For example, determination module 106 may request user confirmation that unknown files classified as public files contain no private data before allowing such files to be backed up to cloud service 206 without encryption. In this example, input from multiple users and/or multiple client devices may improve the classification of files.

Figure 4:
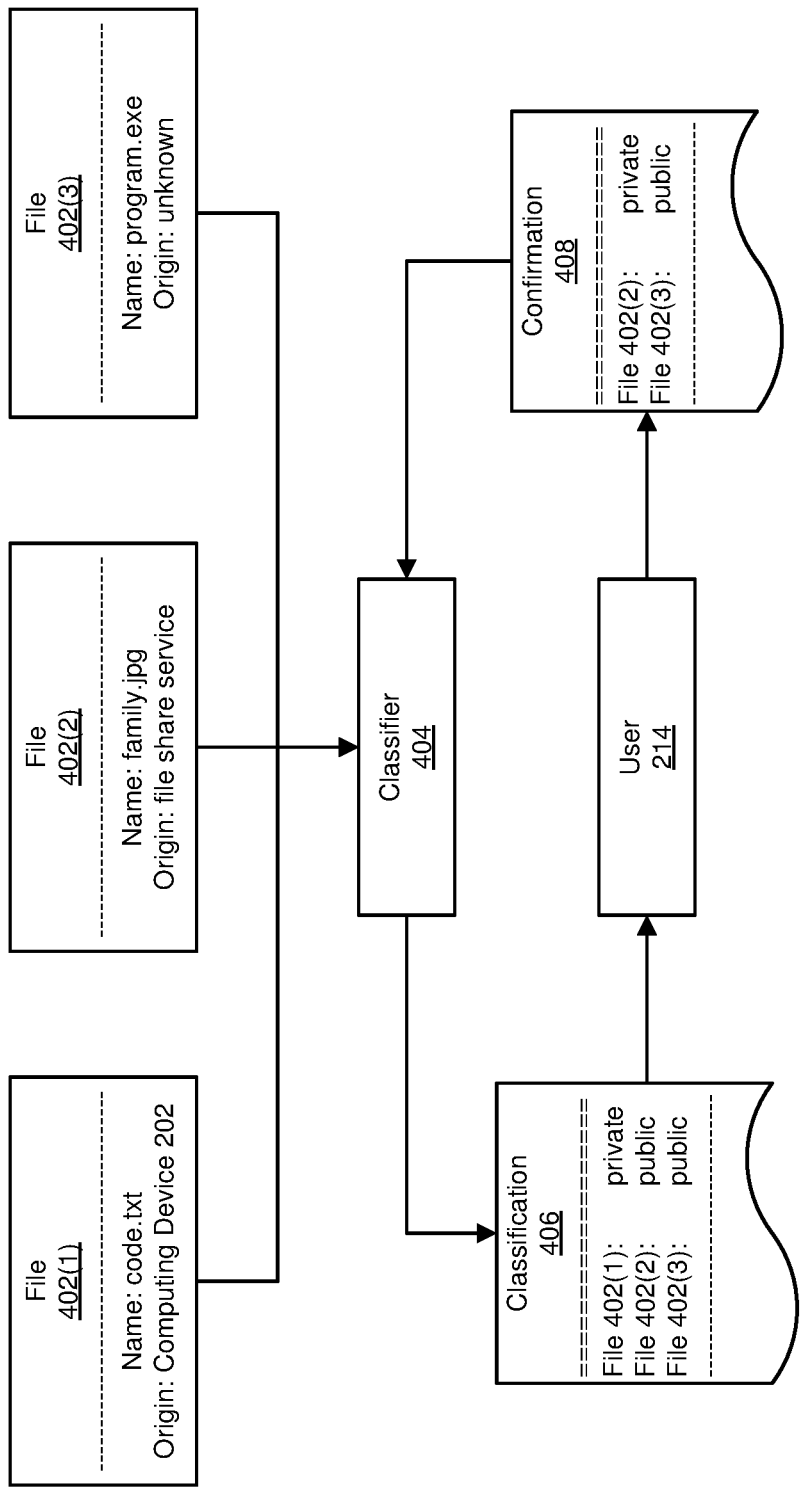
FIG. 4 is a block diagram of an example classification of example public and private files.

As illustrated in FIG. 4, a set of files 402(1), 402(2), and 402(3) may be classified by a classifier 404 into a classification 406 of public and private files. In this example, file 402(1) may contain intellectual information in the form of computer code, and classifier 404 may classify file 402(1) as private. Classifier 404 may not recognize file 402(2) and/or file 402(3) and may classify files 402(2) and 402(3) as public. User 214 may then review classification 406 and send a confirmation 408 that file 402(3) is public. User 214 may also identify file 402(2) as private in confirmation 408 due to a private file origin (e.g., file share service). In this example, user 214 may determine file 402(2) contains data that user 214 wants to protect from a scan by cloud service 206. Computing device 202 may then use confirmation 408 to improve classifier 404 to classify files from the file share service as private.

In the examples of FIG. 4, determination module 106 may prompt user 214 to confirm files classified as public files (e.g., file 402(2) and file 402(3)) do not contain private data. In alternate examples, determination module 106 may also prompt user 214 to confirm private files are correctly classified. Classification history for similar users and/or similar client devices may also be used to improve classifier 404. For example, classifier 404 may apply to all client devices within an organization to enforce privacy standards for the organization. Input from all users within the organization may improve classifier 404. Furthermore, in the above embodiments, the list of known private files and/or the private origins of files may be used to train classifier 404. In additional embodiments, other available file attributes or metadata may also be used to train classifier 404. Files not classified as private files may then be classified as public files.

Returning to FIG. 3, at step 306, one or more of the systems described herein may modify, by the computing device encrypting the private file, the set of files in the backup process. For example, modification module 108 may, as part of computing device 202 in FIG. 2, modify set of files 208 in the backup process by encrypting private file 210.

Modification module 108 may modify set of files 208 in a variety of ways. In some examples, modification module 108 may further modify set of files 208 by encrypting metadata for private file 210. In these examples, modification module 108 may perform file encryption on private file 210 and on all data and metadata, including file hashes, related to private file 210. The term "file encryption," as used herein, generally refers to a process of transforming data to prevent unauthorized access.

In the above examples, modification module 108 may then replace private file 210 with encrypted private file 124 as well as all encrypted metadata. Modification module 108 may then replace set of files 208 with modified set of files 122 to be backed up to cloud service 206. In these examples, modified set of files 122 may include original files and metadata, such as file hashes, of public files in set of files 208 and encrypted versions of private files and related metadata in set of files 208.

Returning to FIG. 3, at step 308, one or more of the systems described herein may complete the backup process for the cloud service with the modified set of files. For example, completion module 110 may, as part of computing device 202 in FIG. 2, complete the backup process for cloud service 206 with modified set of files 122.

Completion module 110 may complete the backup process in a variety of ways. In one embodiment, completion module 110 may send a copy of modified set of files 122, including public files and encrypted private files such as encrypted private file 124, to cloud service 206 via network 204. In another embodiment, completion module 110 may also send all related metadata and/or file hashes to cloud service 206. In these embodiments, completion module 110 may send cloud service 206 a request to backup copy of modified set of files 122, and cloud service 206 may then store the copy of modified set of files 122.

Returning to FIG. 3, at step 310, one or more of the systems described herein may enforce a security policy of the cloud service based on a scan of file hashes. For example, enforcement module 112 may, as part of computing device 202 in FIG. 2, enforce security policy 212 of cloud service 206 based on a scan of file hashes.

Enforcement module 112 may enforce security policy 212 in a variety of ways. In some examples, the scan of file hashes may include a scan of hashes of public files in set of files 208 by cloud service 206, a scan of hashes of public files on computing device 202 by cloud service 206, and/or a comparison of scanned file hashes with a file reputation database by cloud service 206. In these examples, computing device 202 may send modified set of files 122 including hashes of all public files on computing device 202 to cloud service 206. For example, by adding hashes of public files not in set of files 208 to modified set of files 122, computing device 202 may ensure cloud service 206 scans the additional file hashes for extended security. Cloud service 206 may then alert user 214 of malware on computing device 202 that may not be included in set of files 208. File hashes and/or metadata may also be used to compare file information with the file reputation database, which may include a separate service that tracks potential infection of files and updates newly detected malware information and/or may be managed by cloud service 206. In these examples, cloud service 206 may back up files for multiple client devices and detect malware that affects multiple devices.

Additionally or alternatively, the scan of file hashes may include a detection of malware, by cloud service 206, in the scanned file hashes and/or an identification of a file containing the malware. For example, cloud service 206 may include installed security software that periodically scans all backup files and/or file hashes to detect potential malware. As another example, cloud service 206 may send hashes of unknown public files to the file reputation database to identify possible infections. Furthermore, an administrator may track the unknown public files for additional analysis by cloud service 206 or another security service. Cloud service 206 may further identify client devices, such as computing device 202, that may contain the malware file. Cloud service 206 may also detect malware based on information and files from multiple client devices.

In additional examples, enforcement module 112 may enforce security policy 212 of cloud service 206 by alerting user 214 of computing device 202 about the file containing the malware, alerting a security program of computing device 202 about the file containing the malware, proposing a security solution to mitigate the malware, executing the security solution to mitigate the malware, and/or sending telemetry information about the malware to a central security system for analysis. The term "telemetry information," as used herein, generally refers to automatically collected data transmitted from an entity to a receiving device, usually via a network. For example, cloud service 206 may collect and send the location of client devices to the central security system. The central security system may then determine the speed at which the malware infection spreads, locations of devices containing the malware, the extent of the infection, data compromised by the malware, and/or other additional details that may be sent back to cloud service 206 to determine an appropriate security policy, such as security policy 212. In this example, cloud service 206 may then propose a security software solution and/or a security action, as part of security policy 212, to user 214.

Figure 5:
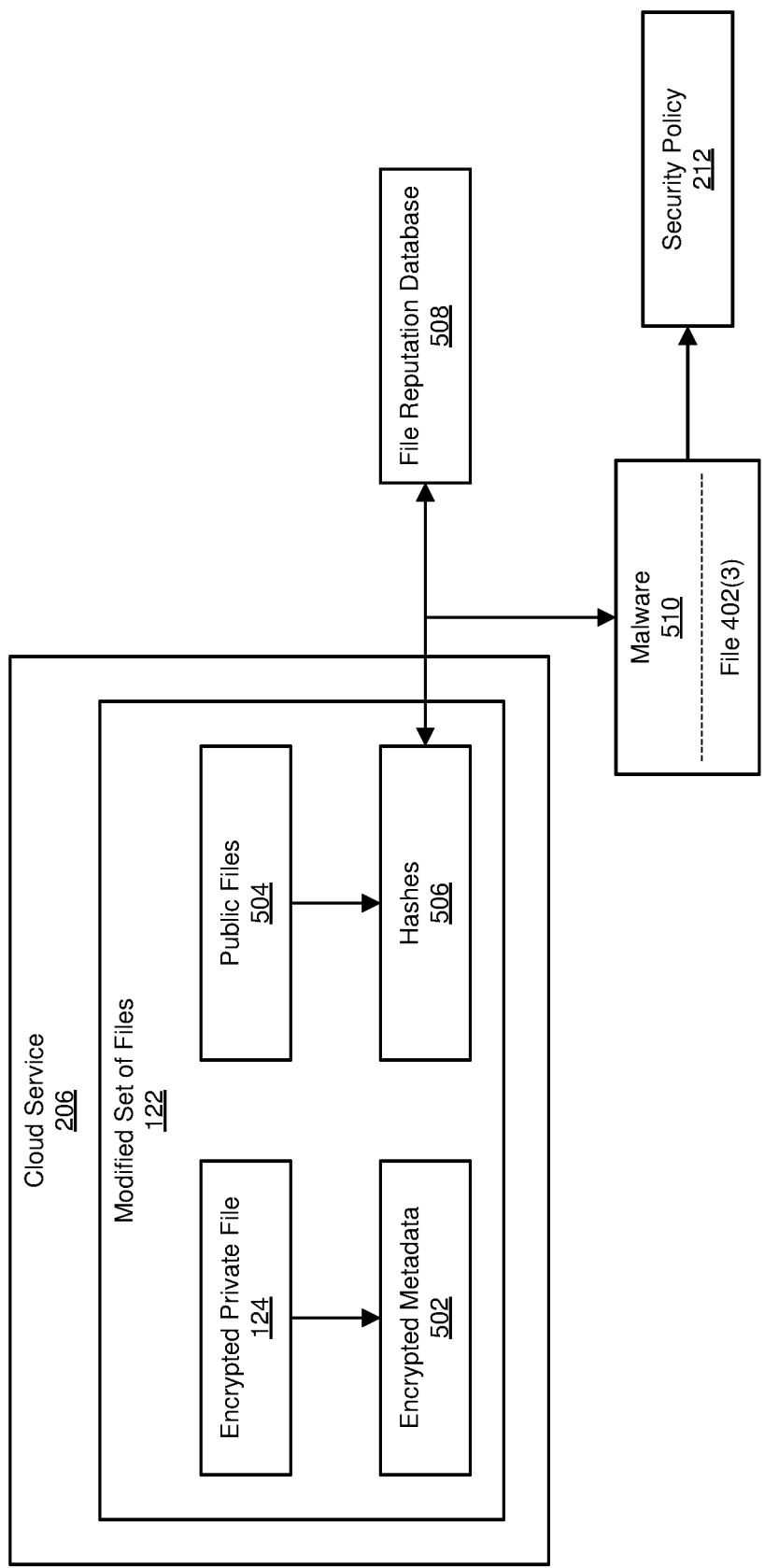
FIG. 5 is a block diagram of an example cloud security detection of example malware.

As illustrated in FIG. 5, computing device 202 may send modified set of files 122 to cloud service 206. In this example, modified set of files 122 may include encrypted private file 124, encrypted metadata 502 of encrypted private file 124, public files 504, and hashes 506 of public files 504. Cloud service 206 may attempt to scan modified set of files 122 and determine encrypted private file 124 and encrypted metadata 502 may not be scannable due to the encryption. Cloud service 206 may then scan public files 504 and hashes 506 and compare hashes 506 with a file reputation database 508. Based on the comparison, cloud service 206 may detect a malware 510 that infects file 402(3) from FIG. 4. In addition, cloud service 206 may select security policy 212 to mitigate malware 510, such as by alerting all client devices that contain file 402(3) about malware 510. For example, cloud service 206 may send user 214 an email suggesting installing security software to quarantine file 402(3). In an alternate example, security policy 212 may require a security software installed on client devices to automatically remove file 402(3).

In some embodiments, the systems described herein may further include identifying a safe version of the file containing the malware. For example, by checking metadata that may include a timestamp of file 402(3) in FIG. 5, cloud service 206 may identify a previously backed up version of file 402(3) that is not infected by malware 510. Cloud service 206 may then recommend user 214 to recover the previous version of file 402(3). Based on the timestamp, cloud service 206 may also identify specific data of file 402(3) that may be compromised, such as personal information about user 214, and adjust security policy 212 accordingly.

As explained above in connection with method 300 in FIG. 3, the disclosed systems and methods may, by encrypting files that may contain private data before files are backed up to a cloud service, protect user privacy while still providing cloud-based security for public files that are more likely to contain malware. Specifically, the disclosed systems and methods may first distinguish between private and public files on a client device based on known attributes of private files and user input, which may also be used to improve detection of private files. By encrypting files and metadata of files determined to be private on the client device, the systems and methods described herein may prevent the cloud service from scanning personal and proprietary information.

The disclosed systems and methods may then provide security for files uploaded to the cloud service, as well as public files not backed up to the cloud, by scanning file hashes sent from the client device to the cloud. Additionally, the systems and methods described herein may send data to file reputation databases to determine the risks posed by files that are unrecognized or have unknown reputations. In some examples, the systems and methods described herein may also further analyze detected malware to identify affected devices or statistics on the spread of the malware. By applying security solutions to malware found through a cloud-based scan, the systems and methods described herein may then provide security for the client device and avoid compromising backup files.

As detailed above, by encrypting data that users may deem to be private on the client side, the disclosed systems and methods may prevent privacy breaches that may otherwise occur on the cloud service side. Furthermore, by executing security scans for malware on the cloud service side, the disclose systems and methods may provide security for client devices, whether or not the client devices have individual security software. Thus, the systems and methods described herein may improve privacy protection for cloud-based computer security.

Figure 6:
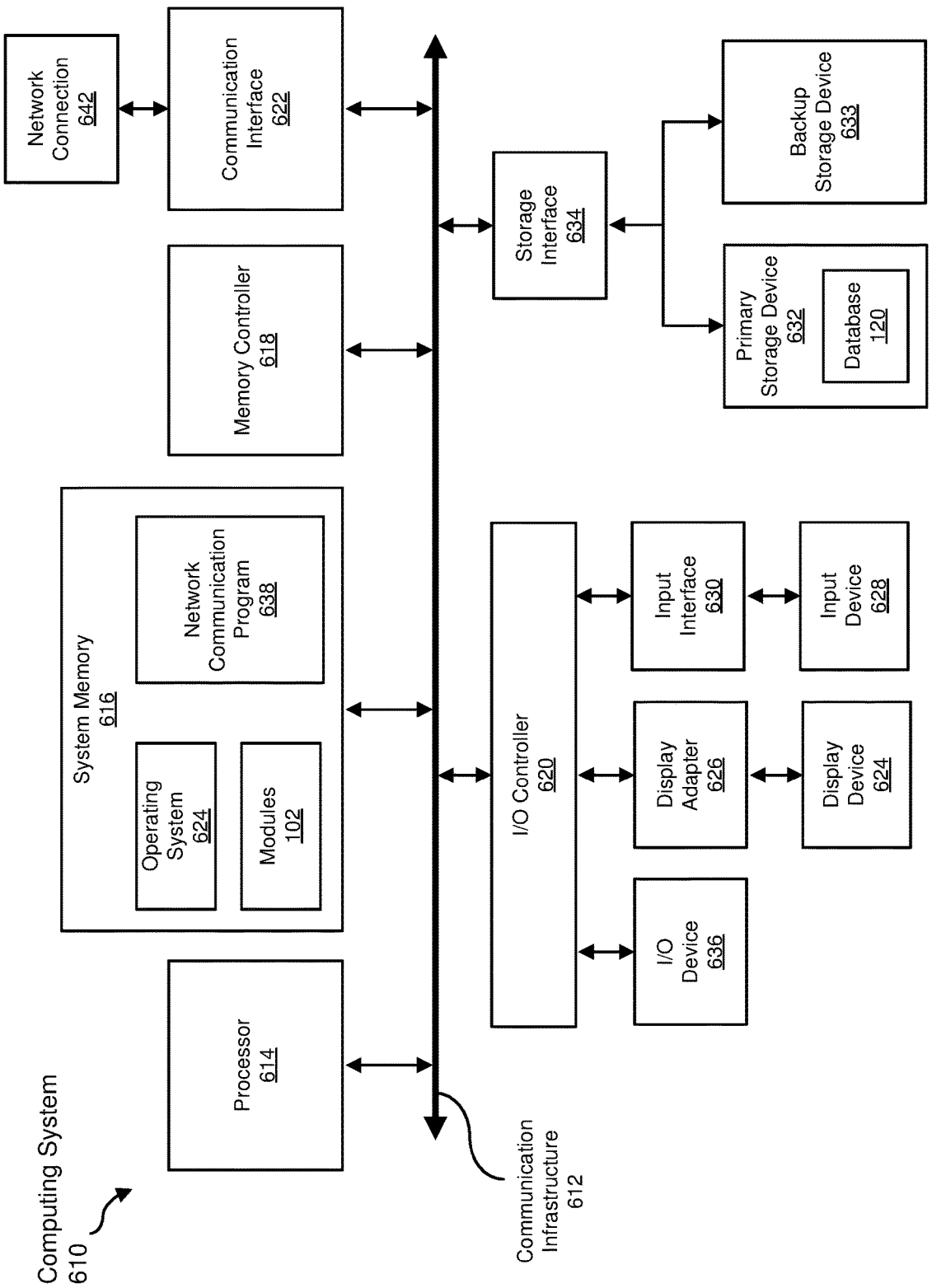
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application-Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an ASIC adapted to implement one or more of the example embodiments disclosed herein.

Figure 7:
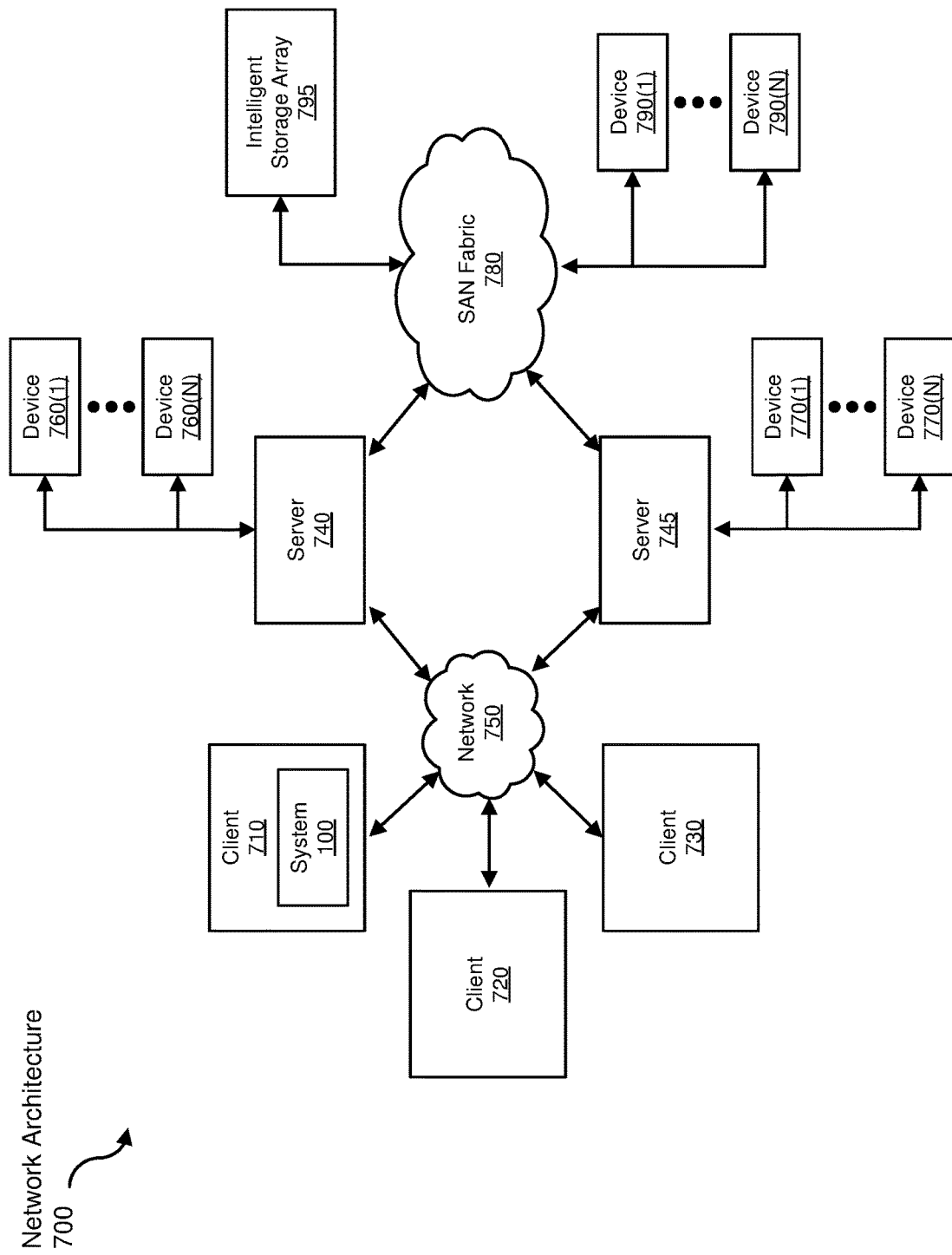
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing privacy in cloud security.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to systemlevel configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a file hash to be transformed, transform the file hash, output a result of the transformation to a storage or output device, use the result of the transformation to detect malware in a file, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing privacy in cloud security, at least a portion of the method being performed by a computing device comprising at least one processor, the method comprising:
    identifying, by the computing device, a set of files in a backup process for a cloud service;
    determining, by the computing device, that at least one file in the set of files is a private file by classifying the set of files into private files and public files;
    modifying the set of files in the backup process to protect user privacy on the cloud service by encrypting the private file and metadata for the private file;
    completing the backup process for the cloud service with the modified set of files;
    enforcing a security policy of the cloud service based on a scan of file hashes, wherein:
        the scan of file hashes comprises a detection of malware in the scanned file hashes and an identification of a file containing the malware;
        the cloud service performs the scan on the file hashes to provide cloud-based security for the public files in the modified set of files; and
        encrypting the private file prevents the cloud service from accessing the private file and the metadata for the private file; and
    identifying a safe version of the file containing the malware.

2. The method of claim 1, wherein determining that the file is a private file comprises at least one of:
    using a file classifier to classify the content of the file;
    identifying a private origin of the file;
    determining that a list of known private files of the cloud service includes the file;

receiving confirmation that the file is private from a user of the computing device; and improving the file classifier based on the received confirmation.

3. The method of claim 2, wherein using the file classifier to classify the content of the file comprises at least one of:

determining that the file contains personally identifiable information; and determining that the file contains intellectual information.

4. The method of claim 2, wherein the private origin of the file comprises at least one of:

a personal device; and a private file share system.

5. The method of claim 1, wherein encrypting the metadata for the private file comprises encrypting a file hash of the private file.

6. The method of claim 1, wherein the scan of file hashes comprises at least one of:

a scan of hashes of the public files in the set of files by the cloud service;

a scan of hashes of public files on the computing device by the cloud service; and a comparison of scanned file hashes with a file reputation database by the cloud service.

7. The method of claim 1, wherein enforcing the security policy of the cloud service comprises at least one of:

alerting a user of the computing device about the file containing the malware;

alerting a security program of the computing device about the file containing the malware;

proposing a security solution to mitigate the malware;

executing the security solution to mitigate the malware; and sending telemetry information about the malware to a central security system for analysis.

8. A system for enforcing privacy in cloud security, the system comprising:

an identification module, stored in memory, that identifies, by a computing device, a set of files in a backup process for a cloud service;

a determination module, stored in memory, that determines, by the computing device, that at least one file in the set of files is a private file by classifying the set of files into private files and public files;

a modification module, stored in memory, that modifies the set of files in the backup process to protect user privacy on the cloud service by encrypting the private file and metadata for the private file;

a completion module, stored in memory, that completes the backup process for the cloud service with the modified set of files;

an enforcement module, stored in memory, that enforces a security policy of the cloud service based on a scan of file hashes, wherein:

the scan of file hashes comprises a detection of malware in the scanned file hashes and an identification of a file containing the malware;

the cloud service performs the scan on the file hashes to provide cloud-based security for the public files in the modified set of files;

encrypting the private file prevents the cloud service from accessing the private file and the metadata for the private file; and the enforcement module identifies a safe version of the file containing the malware; and at least one processor that executes the identification module, the determination module, the modification module, the completion module, and the enforcement module.

9. The system of claim 8, wherein the determination module determines that the file is a private file by at least one of:

using a file classifier to classify the content of the file;

identifying a private origin of the file;

determining that a list of known private files of the cloud service includes the file;

receiving confirmation that the file is private from a user of the computing device; and improving the file classifier based on the received confirmation.

10. The system of claim 9, wherein using the file classifier to classify the content of the file comprises at least one of:

determining that the file contains personally identifiable information; and determining that the file contains intellectual information.

11. The system of claim 9, wherein the private origin of the file comprises at least one of:

a personal device; and a private file share system.

12. The system of claim 8, wherein the modification module encrypts the metadata for the private file by encrypting a file hash of the private file.

13. The system of claim 8, wherein the scan of file hashes comprises at least one of:

a scan of hashes of the public files in the set of files by the cloud service;

a scan of hashes of public files on the computing device by the cloud service; and a comparison of scanned file hashes with a file reputation database by the cloud service.

14. The system of claim 8, wherein the enforcement module enforces the security policy of the cloud service by at least one of:

alerting a user of the computing device about the file containing the malware;

alerting a security program of the computing device about the file containing the malware;

proposing a security solution to mitigate the malware;

executing the security solution to mitigate the malware; and sending telemetry information about the malware to a central security system for analysis.

15. A non-transitory computer-readable medium comprising one or more computer-executable instructions that, when executed by at least one processor of a computing device, cause the computing device to:

identify, by the computing device, a set of files in a backup process for a cloud service;

determine, by the computing device, that at least one file in the set of files is a private file by classifying the set of files into private files and public files;

modify the set of files in the backup process to protect user privacy on the cloud service by encrypting the private file and metadata for the private file;

complete the backup process for the cloud service with the modified set of files;

enforce a security policy of the cloud service based on a scan of file hashes, wherein:

the scan of file hashes comprises a detection of malware in the scanned file hashes and an identification of a file containing the malware;

the cloud service performs the scan on the file hashes to provide cloud-based security for the public files in the modified set of files; and encrypting the private file prevents the cloud service from accessing the private file and the metadata for the private file; and identify a safe version of the file containing the malware.

16. The non-transitory computer-readable medium of claim 15, wherein the computer-executable instructions cause the computing device to determine that the file is a private file by at least one of:

using a file classifier to classify the content of the file;

identifying a private origin of the file;

determining that a list of known private files of the cloud service includes the file;

receiving confirmation that the file is private from a user of the computing device; and improving the file classifier based on the received confirmation.

17. The non-transitory computer-readable medium of claim 16, wherein using the file classifier to classify the content of the file comprises at least one of:

determining that the file contains personally identifiable information; and determining that the file contains intellectual information.

18. The non-transitory computer-readable medium of claim 16, wherein the private origin of the file comprises at least one of:

a personal device; and a private file share system.

\* \* \* \* \*

UNITED STATES PATENT AND TRADEMARK OFFICE
CERTIFICATE OF CORRECTION

PATENT NO. : 10,706,167 B1
APPLICATION NO. : 15/646522
DATED : July 7, 2020
INVENTOR(S) : Ilya Sokolov et al.

Page 1 of 1

It is certified that error appears in the above-identified patent and that said Letters Patent is hereby corrected as shown below:

On the Title Page

In Column 2, item (74), Attorney, Agent, or Firm, Line 1, delete "FisherBroyles LLP" and insert -- FisherBroyles, LLP --, therefor.

Signed and Sealed this
Twenty-fifth Day of August, 2020

Andrei Iancu
*Director of the United States Patent and Trademark Office*